United States Patent [19]

Serafin

[11] 4,158,524

[45] Jun. 19, 1979

[54] MOBILE CHAIR LIFT

[76] Inventor: Joseph W. Serafin, 222 Flat Hills Rd., Amherst, Mass. 01002

[21] Appl. No.: 880,628

[22] Filed: Feb. 23, 1978

[51] Int. Cl.$^2$ .................................................. B60P 1/48

[52] U.S. Cl. .................................... 414/678; 187/8.72; 254/4 C; 254/10 C; 414/917; 414/921

[58] Field of Search ............ 214/1 A, 77 R, DIG. 10, 214/DIG. 13; 254/4 R, 4 C, 10 R, 10 C, 127; 187/8.54, 8.71, 8.72, 8.74, 8.75, 8.77, 27

[56] References Cited

U.S. PATENT DOCUMENTS

| | | | |
|---|---|---|---|
| 1,369,194 | 2/1921 | Sarver | 254/4 R |
| 1,432,159 | 10/1922 | Davis | 187/8.72 X |
| 1,555,637 | 9/1925 | Davis | 187/8.54 X |
| 2,212,940 | 8/1940 | Jackson et al. | 187/8.72 |
| 3,216,704 | 11/1965 | Smith | 214/1 A X |
| 3,347,342 | 10/1967 | Hott | 187/8.75 X |
| 3,565,217 | 2/1971 | St. Louis | 187/27 |
| 3,651,965 | 3/1972 | Simonelli et al. | 214/85 X |
| 3,888,463 | 6/1975 | O'Brien et al. | 254/10 C |

FOREIGN PATENT DOCUMENTS

| | | | |
|---|---|---|---|
| 915148 | 7/1954 | Fed. Rep. of Germany | 254/4 C |
| 301845 | 10/1932 | Italy | 187/8.72 |
| 757746 | 9/1956 | United Kingdom | 254/10 C |

*Primary Examiner*—L. J. Paperner
*Attorney, Agent, or Firm*—Dike, Bronstein, Roberts, Cushman & Pfund

[57] ABSTRACT

A mobile chair lift for raising wheelchairs from ground level to a level such as to enable rolling the wheelchair onto a porch or other flat surface providing for entrance to a home or place of business wherein there is a base frame, a platform, legs mounting the platform on the base frame, kinematic linkage for raising and lowering the platform and maintaining it horizontal during such movement, a reversible motor for actuating the linkage and switches mounted on the platform and on the base frame for controlling operation of the motor. The platform has downwardly-open channels at its opposite longitudinal sides for receiving the legs at ground level and there is a ramp transversely of the forward end of the platform for raising the wheels from the ground onto the platform.

8 Claims, 7 Drawing Figures

MOBILE CHAIR LIFT

BACKGROUND OF THE INVENTION

It is not always convenient or possible to provide a ramp at the entrance to a property of such length as to enable the occupant of a wheelchair to use it for access and egress. Moreover, while there are elevating devices used for raising objects from gound level to a loading platform, these are generally permanently attached to the building and such equipment is not generally acceptable for entrance into a home or for entrance to a retail store or establishment. The chair lift of this invention is designed especially to be mobile so that it may be moved readily to a position for use, which need not be attached to the building or other structure where it is to be used, which is power-operated so as to require no effort on the part of the occupant of the wheelchair to effect its operation and is comprised of materials which are substantially weather-resistant so that it may remain outdoors for extended periods of time without deterioration. The lift is further designed to be very stable, to be safe for loads of up to 200 pounds, to lift to a height of at least 6 feet and to be simple enough to be economically manufactured.

SUMMARY OF THE INVENTION

A chair lift comprising a base frame, a platform, longitudinally-spaced pairs of transversely-spaced legs pivotally connected at their lower ends to the base frame and at their upper ends to the platform so as to enable raising and lowering the platform relative to the base frame while maintaining it in parallel relation thereto, and means for raising and lowering the platform comprising transversely journaled cable takeup means, cable means connected at one end to the cable takeup means for winding thereon and unwinding therefrom, means connecting the other end of the cable means to an end of the platform and means for rotating the cable takeup means, said platform, when lowered to the level of the base frame, extending forwardly from the base frame and providing a surface onto which a wheelchair may be wheeled which is closely adjacent ground level. The platform has at its opposite longitudinal sides upwardly-disposed, downwardly-open channels for receiving the legs when the latter are folded at ground level. There is a reversible motor for effecting rotation of the cable takeup means, a switch conveniently accessible to the occupant of a wheelchair resting on the platform for actuation to start and stop the motor and a switch member operable by elevation of the platform to the predetermined desired level to stop the motor. There is also a switch member operable by lowering the platform to ground level to stop the motor. The cable takeup means comprises two spools journaled transversely of the base in axial alignment connected at their adjacent ends to a gear reducer on the base platform and the reversible motor is connected to the gear reducer. There is also a first drum situated above the spools over which the cables are entrained as they pass from the spools to the platform and a second drum situated forwardly of the first drum with which the cable means are brought into engagement as the platform is lowered toward ground level so that, at ground level, the cable means travel downwardly from the first drum over the second drum at an angle of approximately 30° and from the second drum down to the platform at an angle of approximately 60°. The legs comprise axially aligned parts, one of which is threaded into the other to enable changing their length.

The invention will now be described with reference to the accompanying drawings, wherein.

Figure 2:
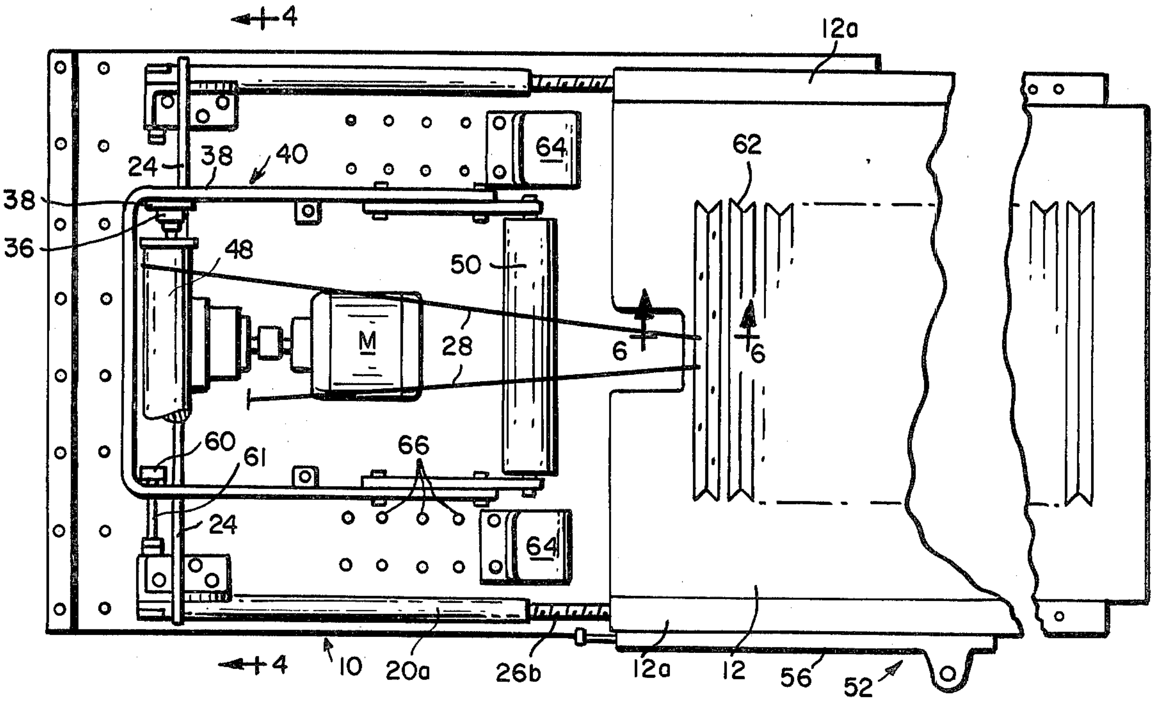
FIG. 2 is a plan view of FIG. 1.
Figure 3:
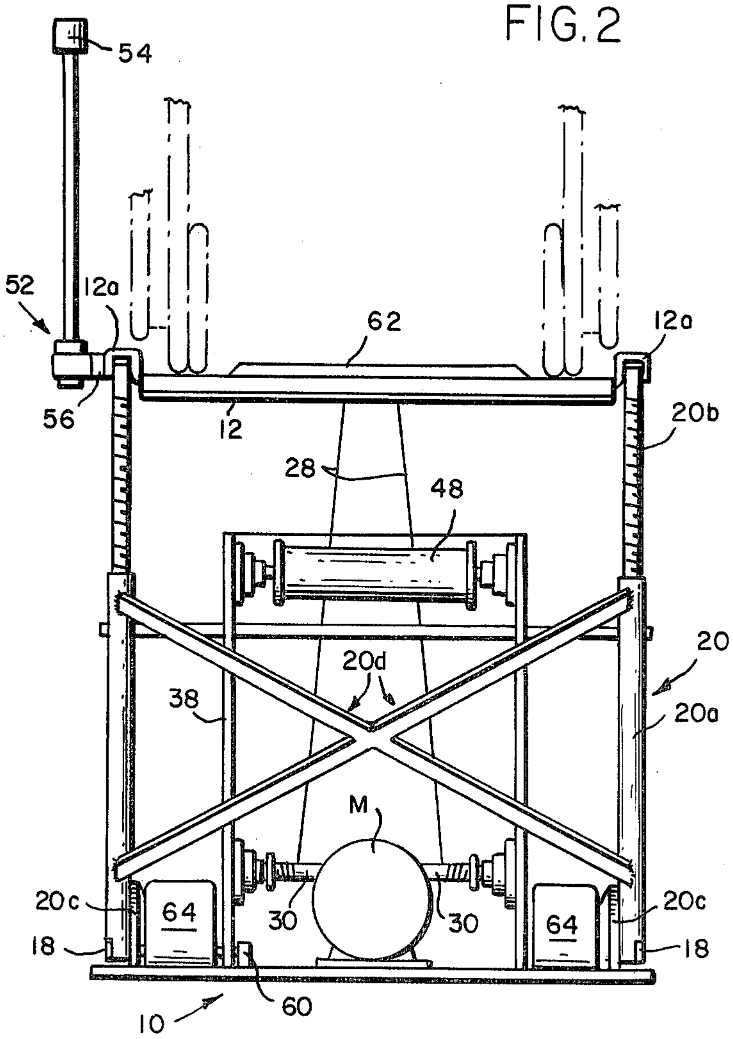
FIG. 3 is an end elevation of FIG. 1 as seen from the right-hand end showing in phantom the lower part of a wheelchair resting thereon.
Figure 3A:
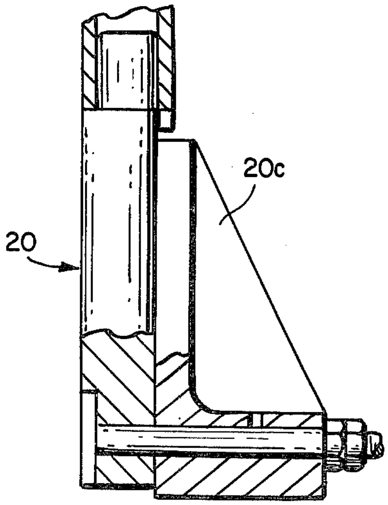
Figure 4:
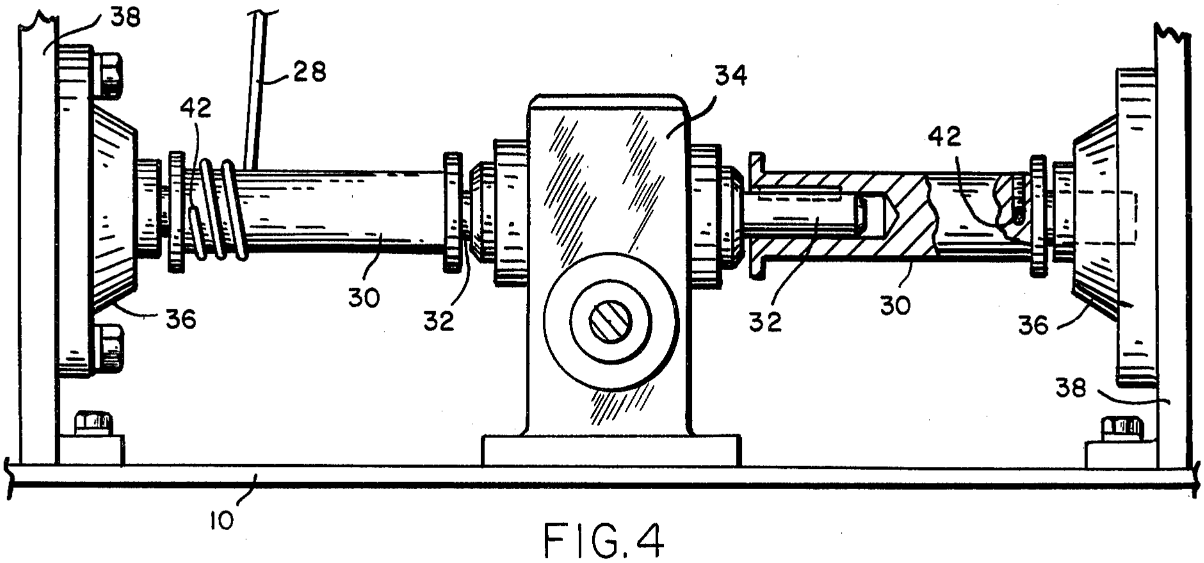
Figure 6:
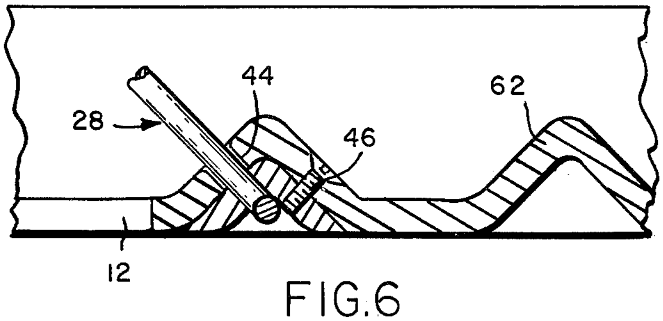
Figure 5:
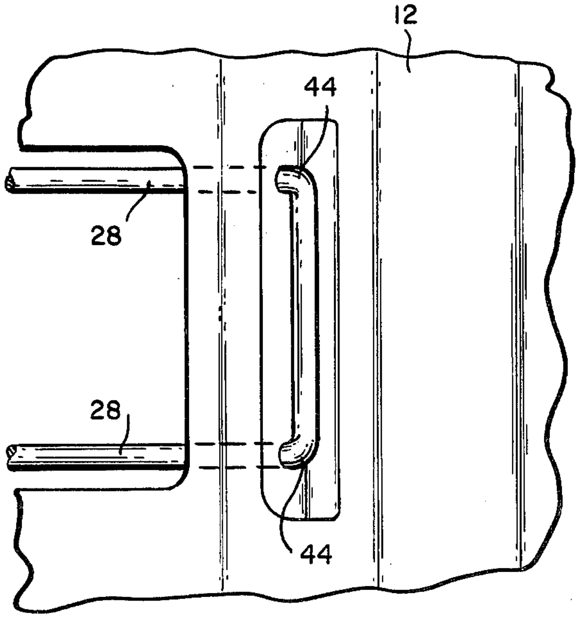

FIG. 3*a* is an elevation partly in section of the bearing plates for preventing side sway of the rear legs;

FIG. 4 is a view partly in elevation and partly in section to much larger scale taken on the line 4—4 of FIG. 2;

FIG. 5 is an enlarged fragmentary plan view of the means for connecting the elevating cables to the platform; and FIG. 6 is an enlarged section taken on the line 6—6 of FIG. 2.

Referring to the drawings, the chair lift of this invention is of a mobile construction so as to enable easily moving it from place to place and comprises essentially a base frame 10, a platform 12 supported from the base frame in parallel relation thereto for movement from a position at the level of the base frame and the ground on which the base frame rests to an elevated position corresponding to the level of the structure to which the chair is to be lifted, and power-operable means 14 for effecting elevation and depression of the platform.

Figure 1:
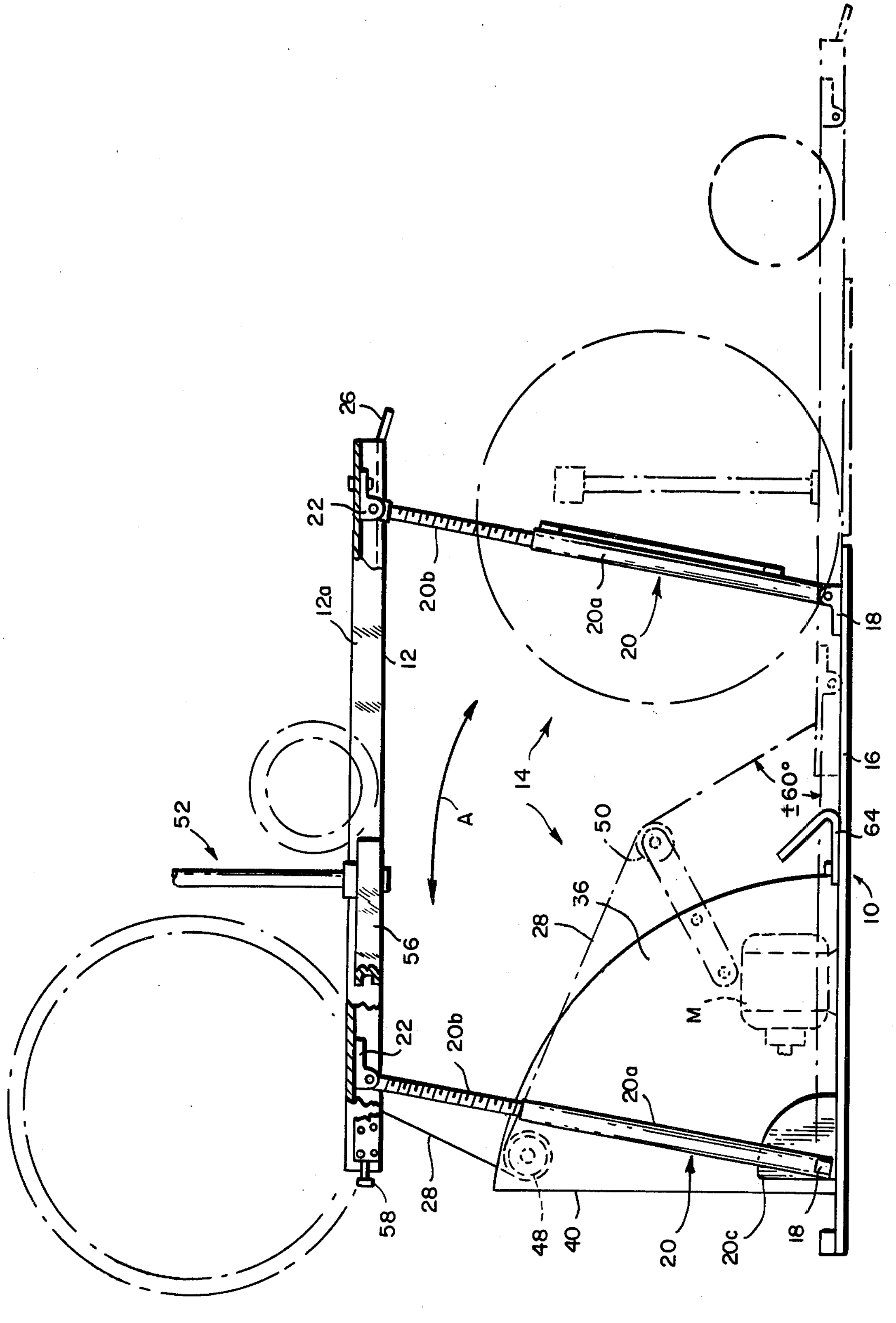
FIG. 1 is a side elevation of the chair lift of this invention showing the platform elevated and in phantom the wheel of a wheelchair resting thereon.

The base frame 10 is a flat sheet of fiberglass 16 of substantially rectangular configuration and is provided with hinge means 18 fixed to its upper side at the four corners to which the lower ends of four legs 20 are connected. The upper ends of the legs are connected by hinge means 22 to the underside of the platform at its four corners. The legs are of equal length so that the platform is held in spaced parallel relation to the base frame. As thus constructed, the platform 12 can be moved from an elevated position such as shown in FIG. 1 in full lines, forwardly in the direction of the arrow A and downwardly to a position substantially at the level of the base frame as shown in dotted lines. Movement of the platform from the full line position in the opposite direction is prevented by a rod 24 supported transversely of the legs.

To provide for ease of rolling the wheelchair onto the platform in its lowered position, the platform is provided with upwardly-formed, downwardly-open channels 12*a*—12*a* at the opposite longitudinal sides for receiving the legs in nested relation therewith when the platform is at ground level and, further, the forward end of the platform is provided along its transverse edge with a downwardly-inclined ramp plate 26 so as to enable the wheels of a wheelchair to be easily rolled from the ground onto the upper surface of the platform.

To provide for heightwise adjustment and, hence, use of the chair lift for structures of different height, each leg is comprised of two axially aligned parts 20*a* and 20*b*, the parts 20*a* containing a threaded nut 20*c* for receiving the parts 20*b* which is externally threaded so that by rotating the parts relative to each other, the length of the legs may be extended or contracted. Such adjustment may be readily effected by detaching the hinge means 22 from the underside of the platform and then rotating the parts 20*b* in one direction or the other.

It will be noted that the hinge pins 20*d* are maintained in place by contact with the inner wall of the channels.

The means 14 for effecting elevation and depression of the platform comprise a cable 28 and a capstan comprised of spools 30—30, FIG. 4, onto which the cable may be wound to lift the platform to its elevated position and from which the cables may be unwound to lower the platform to ground level. The spools 30—30 of the capstan are mounted at one end for rotation on shafts 32—32 extending in opposite directions from a gear reducing unit 34, FIG. 4, mounted on the base frame so that the shafts 32—32 extend transversely thereof and at their other ends in bearings 36—36 which are bolted to vertically spaced bearing plates 38—38 which constitute the walls of an enclosure 40 mounted on the base plate between the legs so as to partially enclose the gear reducing unit 34 and the reversible motor M by means of which the gear reducing unit is driven. As shown in FIG. 4, the opposite ends of the cable 28 are connected to the spools within openings 42—42 and the portion of the cable between the two ends is connected, as shown in FIGS. 5 and 6, to the rear end of the platform by threading the cable through spaced openings 44—44 and binding the threaded portion therein by means of set screws 46—46. The cable portions extending from the spools up to the rear end of the platform, FIGS. 2 and 3, are entrained about a rotatably mounted drum 48 between the bearing plates 38—38 substantially directly above the spools 30—30. The drum 48 is free to turn and guides the cable as the platform is moved upwardly and downwardly. Desirably, a second drum 50, FIG. 2, is mounted between the bearing plates 38—38 at a lower level above the base plate and below the drum 48 forwardly of the spools 30—30 and drum 48 so that in the lower position of the platform, the cable will rise from the platform at its ground level portion to the drum 50 at an angle of approximately 60° . Entraining the cable in this fashion provides for better mechanical advantage and for smoother operation in raising and lowering the platform.

An electric circuit and switch are provided as shown at 52 with the switch 54, FIGS. 1, 2 and 3, in a position to be conveniently accessible to a person occupying the wheelchair when the latter is resting on the platform to actuate the motor in reverse directions; in one direction to raise the platform and in the other direction to lower the platform. The circuitry, including the switch 54, is mounted by a bracket 56 to the side of the platform and is so constructed as to be readily detached and transferred from one side to the other to accommodate persons of right-hand or left-hand capabilities.

At the rear end of the platform, the left end, as seen in FIG. 1, there is a switch member 58 which projects rearwardly therefrom so that as the platform is raised with respect to the structure onto which the wheelchair is to be rolled, the switch 58, by contact with the structure, will stop the reversible motor M with the platform at the desired level for rolling the wheelchair from the platform onto the structure. Actuation of the switch 58 conditions the switch 54 so that when it is again actuated, the motor will start in the reverse direction. There is also a switch 60 at the lower end of the rear legs which is operated by one of the hinge pins 61 when the platform reaches ground level to stop the motor M.

In order to minimize side sway, the rear legs are provided at their lower ends with bearing plates 20*c*—20*c*, FIG. 3*a*. To minimize side sway of the front legs, bearings 20*d* are provided, FIG. 3.

Desirably, the upper surface of the platform is transversely corrugated at 62 to provide reinforcement and to minimize slipping. To prevent movement of the wheelchair too far to the rear when wheeling onto the platform at ground level, there are provided on the base plate 16 wheel stops 64—64 adjustably attached to the platform by means of a series of spaced holes 66.

The base, platform and quadrants are preferably composed of fiberglass. The remaining parts are made of ferrous metals cadmium plated.

It should be understood that the present disclosure is for the purpose of illustration only and includes all modifications or improvements which fall within the scope of the appended claims.

I claim:

1. A chair lift comprising a base frame, a platform, longitudinally-spaced pairs of transversely-spaced legs pivotally connected at their lower ends to the base frame and at their upper ends to the platform so as to enable raising and lowering the platform relative to the base frame for maintaining it in parallel relation thereto, means for raising and lowering the platform comprising transversely-arranged spools, cable means connected at one end to the spools and at the other end to the platform, a gear reducer to which the adjacent ends of the spools are connected, a motor connected to the gear reducer for effecting through the gear reducer rotation of the spools in directions to on the one hand wind the cable means onto the spools and on the other hand to unwind the cable means from the spools, a first idler roll over which the cable means passes from the spools to the platform, a second idler roll situated forwardly of the first idler roll and at a level above the base with which the cable means is brought into engagement as the platform is lowered toward ground level so that at ground level the cable means travels downwardly from the first idler roll over the second idler roll at an angle of approximately 30°, said platform when lowered to the level of the base frame extending forwardly from the base frame and providing a surface onto which a wheelchair may be wheeled which is closely adjacent the ground level.

2. A chair lift comprising a rigid base frame, longitudinally-extendible legs, one at each of the four corners of the base frame, means pivotally connecting the lower ends of the legs to the four corners of the base frame, a platform, means pivotally connecting the upper ends of the legs to the four corners of the platform, said platform being movable by pivotal movement of the legs from a position at the level of the base frame to an elevated position above and parallel to the base frame, a capstan on the base frame, cable means connected at one end to the capstan for winding on and unwinding from the capstan and at the other end to the platform, a first idler roll supported above the capstan over which the cable means is entrained, means for effecting rotation of the capstan and a second idler roll arranged forwardly of the first idler roll on an axis parallel thereto and at a lower level in a position to intercept the cable means as the platform moves toward the level of the base to dispose the cable means running from the second idler roll to the platform at a steeper angle than that running from the second idler roll to the first idler roll.

3. A chair lift according to claim 2 wherein the means for effecting rotation of the capstan is a motor and there is an electric circuit and a switch mounted on the platform in a position to be operated by the occupant of the wheelchair to effect operation of said motor.

4. A chair lift according to claim 2 wherein the legs comprise axially aligned parts, one of which is threaded into the other to enable changing the length of the legs.

5. A chair lift according to claim 2 wherein there is a downwardly-inclined ramp along the entire forward edge of the platform.

6. A chair lift according to claim 2 wherein there are wheel stops on the base frame for determining the position of a wheelchair rolled onto said platform.

7. A chair lift according to claim 6 wherein said wheel stops on the base frame are longitudinally adjustable for accommodating chairs of different size.

8. A chair lift according to claim 2 wherein there is means for limiting rearward movement of the platform rearwardly from its elevated position.

* * * * *